US012783642B2

(12) United States Patent
Röcker et al.

(10) Patent No.: US 12,783,642 B2
(45) Date of Patent: Nov. 3, 2026

(54) DATA PROCESSING DEVICE

(71) Applicant: Infineon Technologies AG, Neubiberg (DE)

(72) Inventors: Thomas Röcker, Munich (DE); Moritz Höchner, Nassach (DE); Stefan Köck, Offenhofen (DE)

(73) Assignee: Infineon Technologies AG, Neubiberg (DE)

( * ) Notice: Subject to any disclaimer, the term of this patent is extended or adjusted under 35 U.S.C. 154(b) by 144 days.

(21) Appl. No.: 18/971,001

(22) Filed: Dec. 6, 2024

(65) Prior Publication Data

US 2025/0190546 A1 Jun. 12, 2025

(30) Foreign Application Priority Data

Dec. 8, 2023 (DE) ......................... 102023134481.1

(51) Int. Cl.
*G06F 21/54* (2013.01)
*G06F 21/57* (2013.01)

(52) U.S. Cl.
CPC ............ *G06F 21/54* (2013.01); *G06F 21/575* (2013.01)

(58) Field of Classification Search
None
See application file for complete search history.

(56) References Cited

U.S. PATENT DOCUMENTS 4,523,827 A * 6/1985 Masunaga ................ G02B 7/30 396/264
8,656,400 B2 * 2/2014 Foo ....................... G06F 9/3851 717/130
8,981,932 B2 * 3/2015 Sonnekalb ............. G08B 29/18 713/100
9,602,025 B2 * 3/2017 Deboy .................... H02J 3/381
10,372,545 B2 * 8/2019 Traykov .............. G06F 11/1438
10,684,788 B1 * 6/2020 Hasbe ................. G06F 11/1464
11,133,745 B2 * 9/2021 Chieng ..................... G05F 1/56
11,537,389 B2 * 12/2022 Rosner .................... G06F 8/654
(Continued)

FOREIGN PATENT DOCUMENTS

EP 3835988 A1 6/2021
EP 4012565 A1 6/2022
(Continued)

*Primary Examiner* — Piotr Poltorak
(74) *Attorney, Agent, or Firm* — Eschweiler & Potashnik, LLC

(57) ABSTRACT

According to one exemplary embodiment, a data processing device is described, having a plurality of data processing components which are configured to exchange respective synchronization information with one another in pairs at predefined synchronization points, and having a writable configuration memory configured to store, for each reset type of a plurality of reset types, whether the exchange of the respective synchronization information is required for all of the synchronization points, in order that the respective pair of data processing components may continue its processing beyond the synchronization points. The data processing components are configured to continue or not continue their processing beyond synchronization points in accordance with the content of the writable configuration memory in the absence of an exchange of synchronization information.

17 Claims, 4 Drawing Sheets

(56) References Cited

U.S. PATENT DOCUMENTS

| | | | | |
|---|---|---|---|---|
| 11,934,257 | B2 | 3/2024 | King et al. | |
| 11,941,259 | B2 | 3/2024 | Geng et al. | |
| 11,953,676 | B2 * | 4/2024 | Druml | G02B 26/101 |
| 2009/0319806 | A1 * | 12/2009 | Smith | G06F 21/575<br>726/19 |
| 2014/0191582 | A1 * | 7/2014 | Deboy | H02J 3/381<br>307/82 |
| 2018/0203773 | A1 | 7/2018 | Kawada | |
| 2020/0073452 | A1 * | 3/2020 | Isberg | H04W 4/70 |
| 2022/0284105 | A1 * | 9/2022 | Krishnegowda | G06F 13/1668 |

FOREIGN PATENT DOCUMENTS

| | | | | | |
|---|---|---|---|---|---|
| KR | 20080014690 | A | * | 2/2008 | H04L 67/1095 |
| WO | WO-2004050369 | A1 | * | 6/2004 | B41J 2/04543 |

* cited by examiner

DATA PROCESSING DEVICE

REFERENCE TO RELATED APPLICATIONS

This application claims priority to German Patent Application 10 2023 134 481.1, filed on Dec. 8, 2023, the contents of which are hereby incorporated by reference in their entirety.

TECHNICAL FIELD

Exemplary embodiments generally relate to data processing devices.

BACKGROUND

Data processing devices which are used for critical applications, such as control units for vehicles, typically have high demands on operational safety and possibly also data security. However, since the outlay would be too high to provide all involved data processing components with measures which guarantee high operational safety and/or data security, typically data processing components are only provided with such measures if their operational safety and, if appropriate, data security are essential to the operational safety and, if appropriate, data security of the overall system. In this case, however, a certain separation is desirable between the data processing components which are provided with such measures and data processing components which are not provided with such measures, so that the operational safety and, if appropriate, data security of the overall system is not impaired. Nevertheless, data processing components should work together reliably for a given application case with regard to given requirements on operational safety and data security.

SUMMARY

According to one exemplary embodiment, a data processing device is described, having a plurality of data processing components which are configured to exchange respective synchronization information with one another in pairs at predefined synchronization points, and having a writable configuration memory configured to store, for each reset type of a plurality of reset types, whether the exchange of the respective synchronization information is required for all of the synchronization points, in order that the respective pair of data processing components may continue its processing beyond the synchronization points. The data processing components are configured to continue or not continue their processing beyond synchronization points in accordance with the content of the configuration memory in the absence of an exchange of synchronization information.

BRIEF DESCRIPTION OF THE DRAWINGS

The figures do not reflect the actual proportions but are intended to be used to illustrate the principles of the various exemplary embodiments. Various exemplary embodiments are described below with reference to the following figures.

a.

b.

C.

d.

DETAILED DESCRIPTION

The following detailed description refers to the accompanying figures, which show details and exemplary embodiments. These exemplary embodiments are described in such detail that a person skilled in the art can carry out the invention. Other embodiments are also possible and the exemplary embodiments can be changed in structural, logical and electrical terms without departing from the subject matter of the invention. The various exemplary embodiments are not necessarily mutually exclusive; rather, various embodiments can be combined with one another to produce new embodiments. In the context of this description, the terms "connected", "attached" and "coupled" are used to describe both a direct and an indirect connection, a direct or indirect attachment and a direct or indirect coupling.

Figure 1:
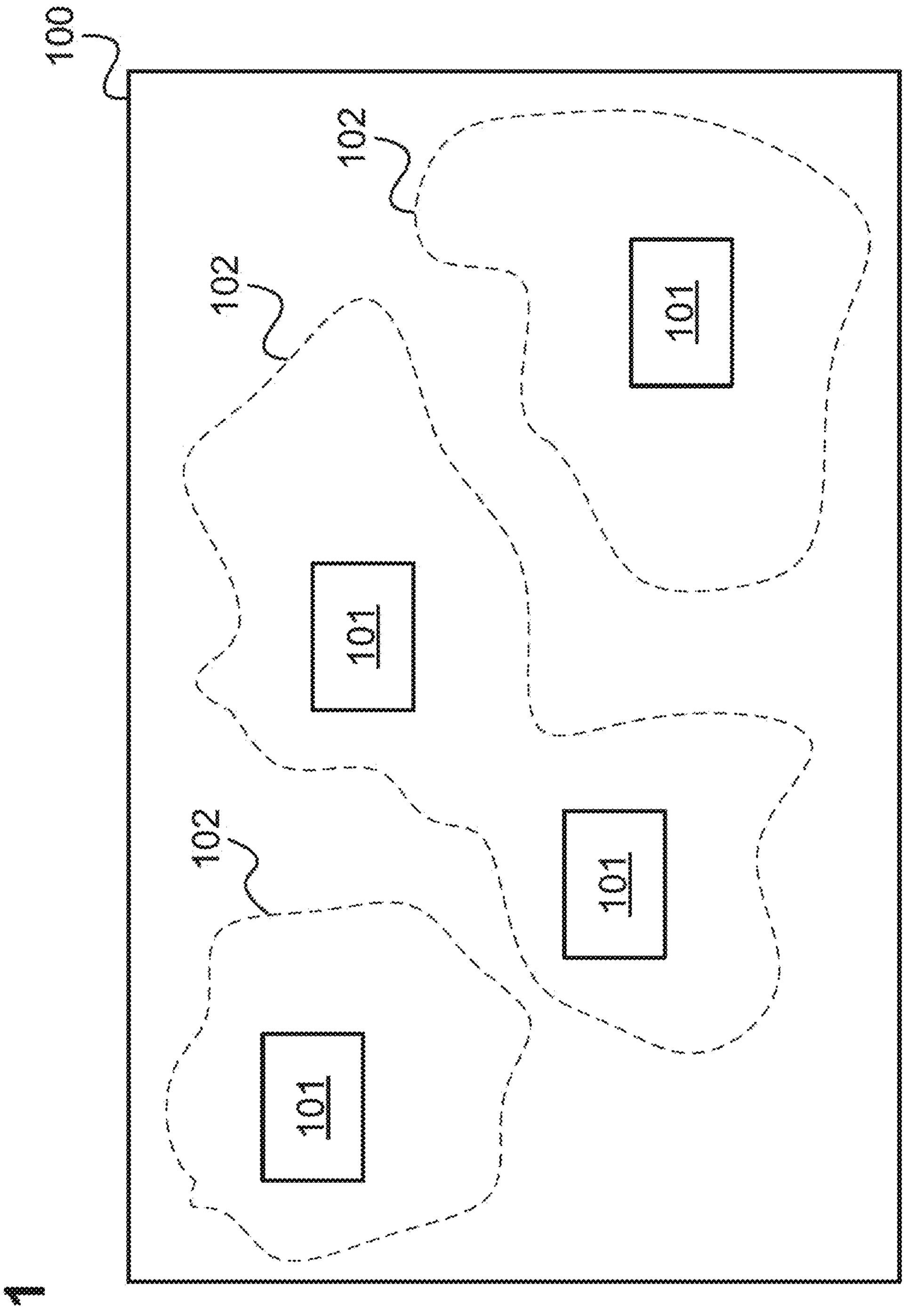
FIG. 1 shows a data processing device.

FIG. 1 shows a data processing device 100.

The data processing device 100 has a plurality of data processing components 101, which are assigned to different (operational safety or data security) domains 102, which differ in that they are subject to respective requirements regarding operational safety and data security which differ at least in part between the domains 102. By way of example, the data processing device 100 is an electronic control unit (ECU) of a vehicle and a particular ASIL (automotive safety integrity level) or CAL (cybersecurity assessment level), e.g. ASIL-D for a functionality which is critical to passenger safety, is required for one of the domains 102, while another of the domains 102 is a "QM" (quality management) domain, for which only low operational safety and data security requirements apply. However, the data processing device 100 may also be another type of data processing device 100 with different domains with respective (at least to some extent different) operational safety and data security requirements, e.g. a microcontroller for another application, a SoC (system on chip) for any application, etc.

Each domain 102 thus provides a particular functionality, wherein it is designed to do so such that particular operational safety and data security requirements are satisfied, as given, for example, by respective norms and/or standards such as ISO26262, ISO21434 or IATF61508. In this case, each domain 102 is a combination of hardware and software, that is to say the data processing components 101 which belong to a respective domain 102 run a specific software, for example firmware, operating system (OS) or respective OS components and one or more applications (or application components).

In order to meet respective operational safety and/or data safety requirements for a single domain 102, various mechanisms are typically available (redundant processing such as Lockstep, error correction mechanisms (EDC (error detection and correction)), etc.).

If two domains 102 differ in terms of their requirements, however, a separation of the two domains 102 is required in order that the one which only satisfies lower requirements with regard to operational safety and/or data security requirements does not adversely affect the operational safety and/or data security of the others (e.g., because there is an unsecured communication channel between the domains or because, due to a dependency of a first domain on a second domain, the first domain can be disabled by a successful attack on the second domain), such that the operational safety and/or data security requirements of the other domain are no longer met.

Difficulties thus arise when cross-coupling between domains 102 is required. This is complicated by the requirement for high availability for some domains 102 (i.e., for the functionality provided by them), even if another domain 102 fails. For example, the steering of an autonomous vehicle should function even if no secure (in terms of data security) communication is currently possible between a domain 102 which calculates the steering signals and the respective actuator, because the domain 102 responsible for the secure communication (e.g. encryption) has failed. If there is no cross-coupling, respective measures can be provided for the individual domains, such that the respective operational safety and/or data safety requirements are met. Accordingly, it may be desirable to reduce the cross-coupling, i.e. to keep domains 102 as separate as possible from one another.

If the data processing device 100 is started afresh, this initial state becomes particularly important: it acts as a Root of Trust, or Root of Integrity, for the subsequent software components in the execution sequence. This is relevant in particular if critical tasks (for example operational safety-critical tasks in a vehicle) are to be carried out.

If a domain 102 has respective mechanisms for data security and operational safety (such as Lockstep and error correction), etc., the operational safety and data security of the respective domain 102 can be maintained if, as described above, transverse coupling to other domains 102 that do not have these measures (because they are subject to lower requirements) is kept sufficiently low. The selective prevention or reduction of cross-couplings between domains is thus already desirable in the early start phase (i.e., "pre-operating system phase" (or "pre-OS phase"), i.e., the phase after startup or reset until the software is loaded, typically operating system components). However, it should be noted here that certain measures such as error correction mechanisms have not yet been set up (i.e. are not yet functional) in the early start phase. Therefore, in the early start phase, there is a particular situation for which specific dedicated approaches are desirable in order to meet the various operational safety and/or data security requirements.

The data processing device 100 may enter the pre-OS boot state not only after power-on-reset (PORST), but also after a software reset, as may be performed frequently in response to a fault (e.g., multiple times in the course of a vehicle control cycle). According to various embodiments, these two cases are distinguished, as explained in more detail below, since, for example, the integrity of program code does not need to be checked on each software reset (for example since the previous test result still has validity).

According to various embodiments, an approach is provided which enables the handling of errors in the early start phase, such that a particular availability is satisfied, e.g., it is ensured that a control unit can provide a functionality critical to passenger safety at least in a reduced form (for example, steering without encryption of the communication) until the next reset (for example if a QM domain entrusted with encryption tasks fails). However, since, depending on the application in which the data processing device 100 is used various operational safety and/or data security requirements may exist (e.g., encryption may be critical for some applications, while in other applications its failure is tolerated in favor of a basic functionality that is to be guaranteed (e.g., steering)), according to various embodiments it is provided that it is possible to configure per reset type (e.g. power-on-reset or software reset) which domains 102 are critical and which are not. This is expressed in the fact that it is configurable whether a domain 102 must wait for synchronization with another domain 102 before proceeding with its respective processing (e.g., begins to load its operating system).

Figure 2:
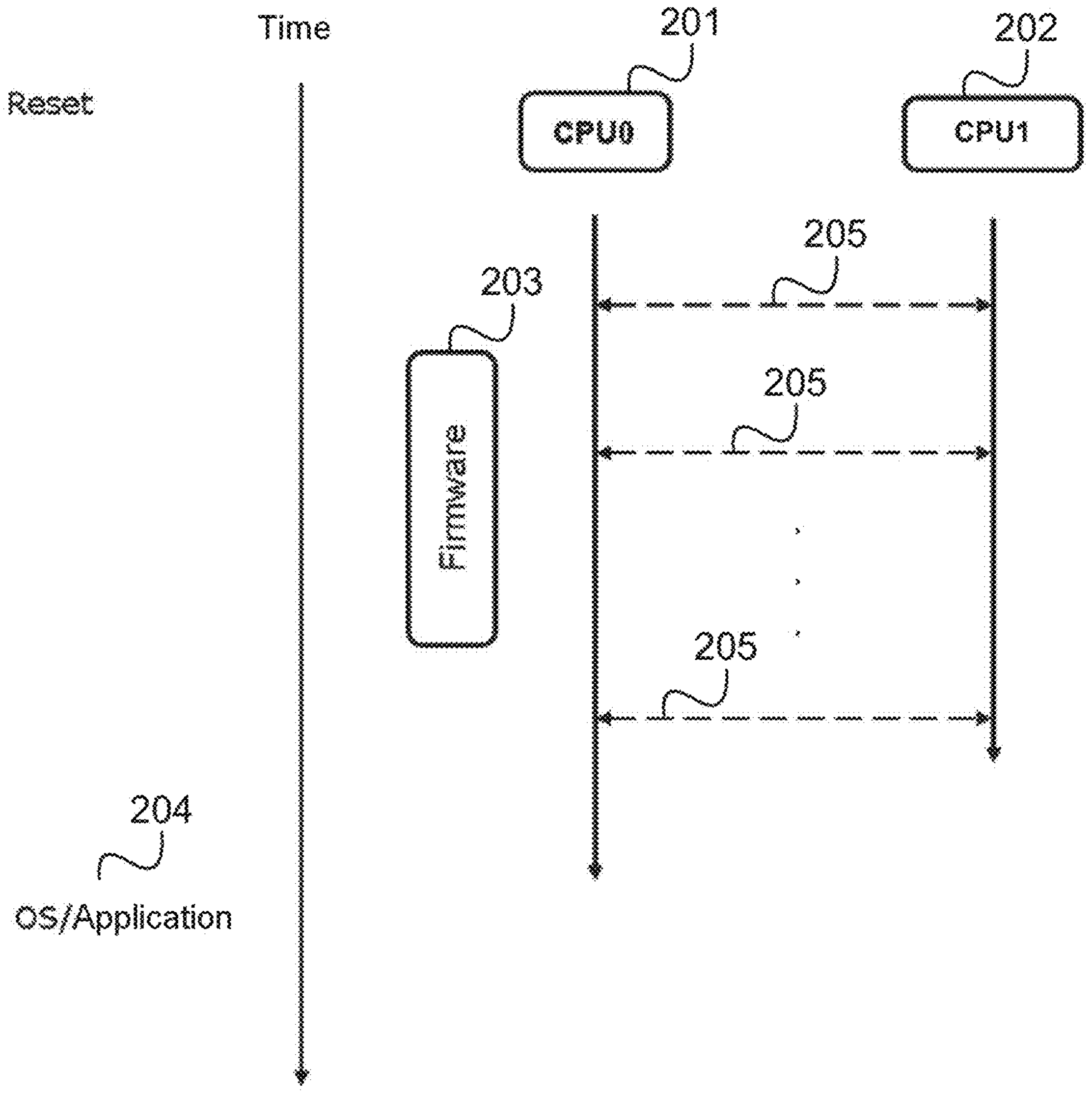
FIG. 2 shows an example of an early start phase according to one embodiment.

FIG. 2 shows an example of an early start phase according to one embodiment.

In this example, there are two domains, the first one containing a first processor 201 and the second one containing a second processor 202. For example, the first processor 201 provides a particular "host" functionality and the second processor 202 provides (data) security functionality (e.g., encryption of control signals) that the first processor 201 can use.

The early start phase begins with a reset, wherein this can be a power-on reset or else a software reset. Both processors 201, 202 then operate according to the firmware 203 of the data processing device 100 (which is stored in a non-volatile memory of the data processing device 100, which is, for example, one of the components 101).

The early start phase ends with the loading of software 204 (operating system component or application).

At certain synchronization points (these are defined in the firmware 203), synchronizations 205 take place between the two processors 201, 202, that is to say in each case a communication for synchronization of the two processors 201, 202 takes place. According to various embodiments, it is provided that per reset type (e.g. power-on-reset and software reset) it is possible to configure which part (e.g. none, some or all) of the synchronization points defined (in the firmware 203) must be respected so that the two processors are allowed to proceed with their processing. If a synchronization point is defined for a specific type of reset as blocking in this sense, then in each early start phase after this type of reset both processors 201, 202 must have reached this synchronization point (that is to say a respective stage of their respective processing) (i.e. the corresponding synchronization 205 must have taken place) before the two processors 201, 202 are allowed to proceed with their respective processing. Thus, if both processors 201, 202 do not reach the synchronization point, they enter an error state and halt processing, for example, until a further reset operation occurs.

The procedure for synchronization is configured such that, on the one hand, a reset-type-dependent separation of the two processors 201, 202 (for the reasons mentioned above) is provided or can be provided, however, timing requirements of the respective reset type can also be complied with and, finally, a consistent state of the data processing device 100 is achieved at the end of the early start phase. As a result of the adjustable dependency (and thus coupling) of the two domains (here of the two processors 201, 202), it is possible to avoid a restriction of the availability (if this is justifiable from an operational safety and data security viewpoint).

For the synchronizations 205, for example, for each of the processors 201, 202 one or more registers for data exchange are provided (Mailbox), which can be accessed for writing or reading only, depending on the communication direction. The respective processor 201, 202 writes synchronization information to the register assigned to it when it has reached a respective processing stage and the other processor 201, 202 can read it out in order to check whether a particular synchronization point has been reached by the processor 201, 202. As a result, protected unidirectional communication paths between the domains and thus a high degree of separation of the two domains can be achieved.

The adjustable dependence between the two domains is achieved, for example, by the fact that it is possible to specify in a non-volatile memory of the data processing device 100 (e.g. a region of a flash memory of the data processing device 100) (e.g. by a user, wherein the user may be e.g. a manufacturer of a vehicle in which the data processing device 100 is deployed) which of a plurality of configuration options is to be followed. The configuration options/adjustable variants are fixed permanently for the user via the control flow of the firmware. The configuration option can be set individually for each reset type of a plurality of reset types (that is to say set by corresponding writing of the non-volatile memory). The setting of the dependence, i.e. the setting of which synchronization points (after a reset of the respective reset type) are blocking, enables the adjustment of the sensitivity of a domain to a failure of another domain.

Table 1 shows examples of the possible settings for each of the following reset types e. "Cold port" (CPORST): cold power-on reset, i.e. power-on reset at the start of the power supply of the data processing device 100, also referred to as cold start or cold start reset f. "Warm PORST" (WPORST): warm power-on reset, i.e. power-on reset triggered via pin of the data processing device 100, also referred to as warm start or warm start reset g. "SysRST": Software reset triggered by operating system h. "AppRST": Software reset triggered by application k. "Background Non-Blocking" (Bit Combination 001): No synchronization point is blocking and the domains can continue in any order at the end of the early start phase, as determined from the runtime of the program code (firmware) executed by them Every other bit combination than these three is invalid and leads to an error state.

Critical synchronization points are typically divided into two classes: Start of shared (i.e., across domains) hardware functionalities and synchronization events used (i.e., communication between the running program codes). An example of shared hardware functionality may be, for example, the non-volatile memory of the data processing device, since further processing is not possible, for example, if the non-volatile memory is not functioning. By contrast, synchronization with a random number generator is possibly not critical, for example, since random numbers can be dispensed with (for example by dispensing with a certain degree of data security which is tolerable for a present application). Here, the non-volatile memory and the random number generator are examples of components shared by a plurality of (other) domains. The setting as to whether synchronization with such (for example shared) components is mandatory (i.e. blocking), allows a certain (reset-type-dependent) error handling of these components in the early start phase.

Figure 3:
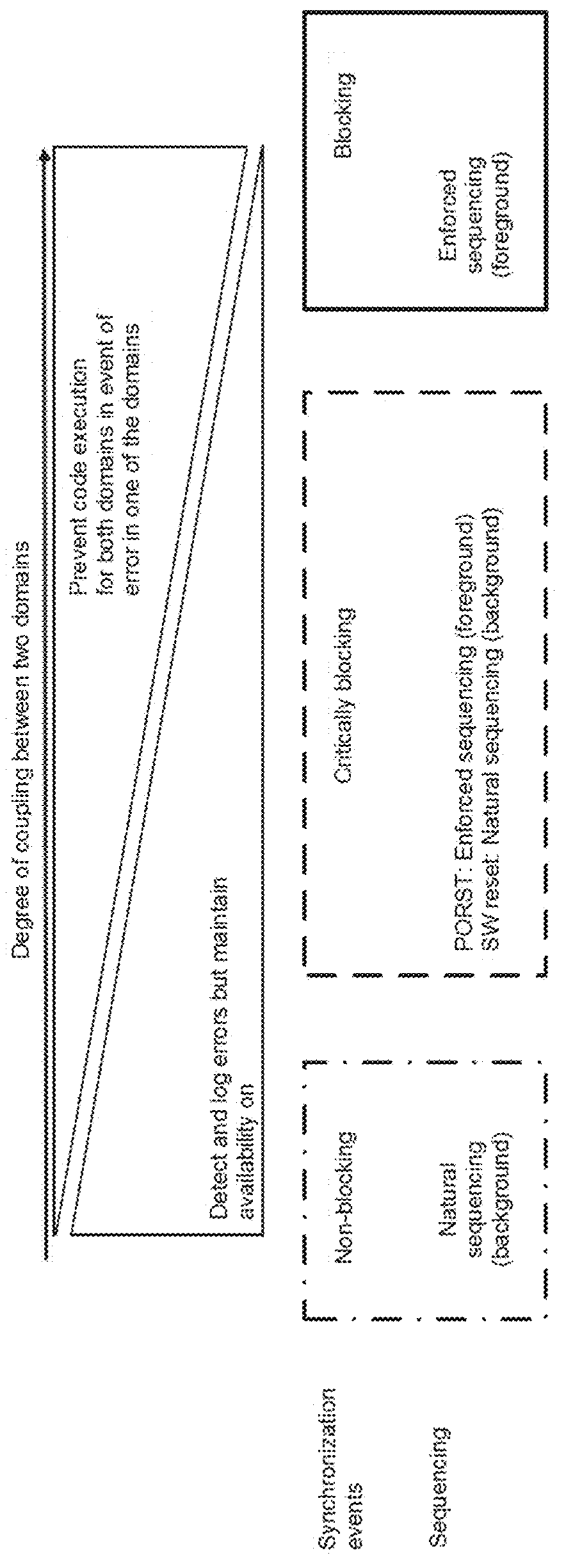
FIG. 3 illustrates the scalability of the dependency between two data processing device domains.

FIG. 3 illustrates the scalability of the dependency between two domains by means of the above adjustment

TABLE 1

| 11 10 9<br>CPORST | 8 7 6 5<br>WPORST | 4 3 2<br>SysRST | 1<br>AppRST |
|---|---|---|---|
| Boot mode after cold power-on-reset:<br>100b: Foreground<br>010b: Background Critically Blocking<br>001b: Background Non-blocking<br>Otherwise: Invalid, fault state | Boot mode after warm power-on-reset:<br>100b: Foreground<br>010b: Background Critically Blocking<br>001b: background Non-blocking<br>Otherwise: Invalid, fault state | Boot mode after OS reset:<br>100b: Foreground<br>010b: Background Critically Blocking<br>001b: Background Non-blocking<br>Otherwise: Invalid, fault state | Boot mode after application reset:<br>100b: Foreground<br>010b: Background Critically Blocking<br>001b: Background Non-blocking<br>Otherwise: Invalid, fault state |

Here, the configuration area in the non-volatile memory for the selection of the configuration option per reset type comprises 12 bits (0-11), wherein three bits are provided for each reset type, which make it possible to set one of the following three configuration options, wherein the configurations (i.e. each 3-bit configuration word) in this example also indicate in what order the domains continue processing after the end of the early start phase:

i. "Foreground" (Bit Combination 100): All synchronization points are blocking (i.e. "foreground" implies "blocking" in this example); the domains follow a sequence defined (e.g. in firmware 203) after the end of the early start phase ("enforced sequencing"). For example, the second processor 202 first begins with the execution of user-defined program code (e.g., to establish secure communication for the first processor 201)

j. "Background Critically Blocking" (Bit combination 010)": The synchronization points (in the firmware 203) defined as being critical are blocking, and the domains can continue in any order at the end of the early start phase, as determined from the runtime of the program code (firmware) executed by them ("natural sequencing")

options for synchronization points "blocking", "critically blocking" and "non-blocking" and for the sequence after the early start phase.

The left (dot-dashed marked) setting, i.e. non-blocking, natural sequence, ensures that an error-free domain can complete the early start phase even when an error occurs in another domain. This means that it is ensured that the execution of the next software stage (e.g. bootloader, application, OS start) is achieved in the error-free domain. This implies that the handling of the error-prone domain can be flexibly configured in this software stage (from ignoring the error to emergency mode). In this setting, two aspects may be problematic: i. the reaction time of the system to a potentially critical event is delayed (by "shifting" from the early start phase into the subsequent phase), ii. the detection heuristic with respect to randomized/willfully introduced errors is reduced.

The middle (dashed) setting, i.e. critical blocking, enforced sequencing for PORST and natural sequencing for SW resets (i.e. mixed setting for the sequence), enables early error handling for shared-use components (i.e. critical in the sense of the execution of both domains), and a defined sequence of the start of the following software components in the case of a PORST, without the overall system being caused to fail completely by the failure of a domain in the event of a software reset. For example, in the case of a software reset (by the vehicle controller), a mode with limited functionality (but maintenance of important driving functions) can thus be implemented in a vehicle. The right-hand (continuous border) setting forms the greatest possible error detection, which is obtained at the expense of a reduction in availability and therefore often does not represent a good compromise in terms of application.

Figure 4:
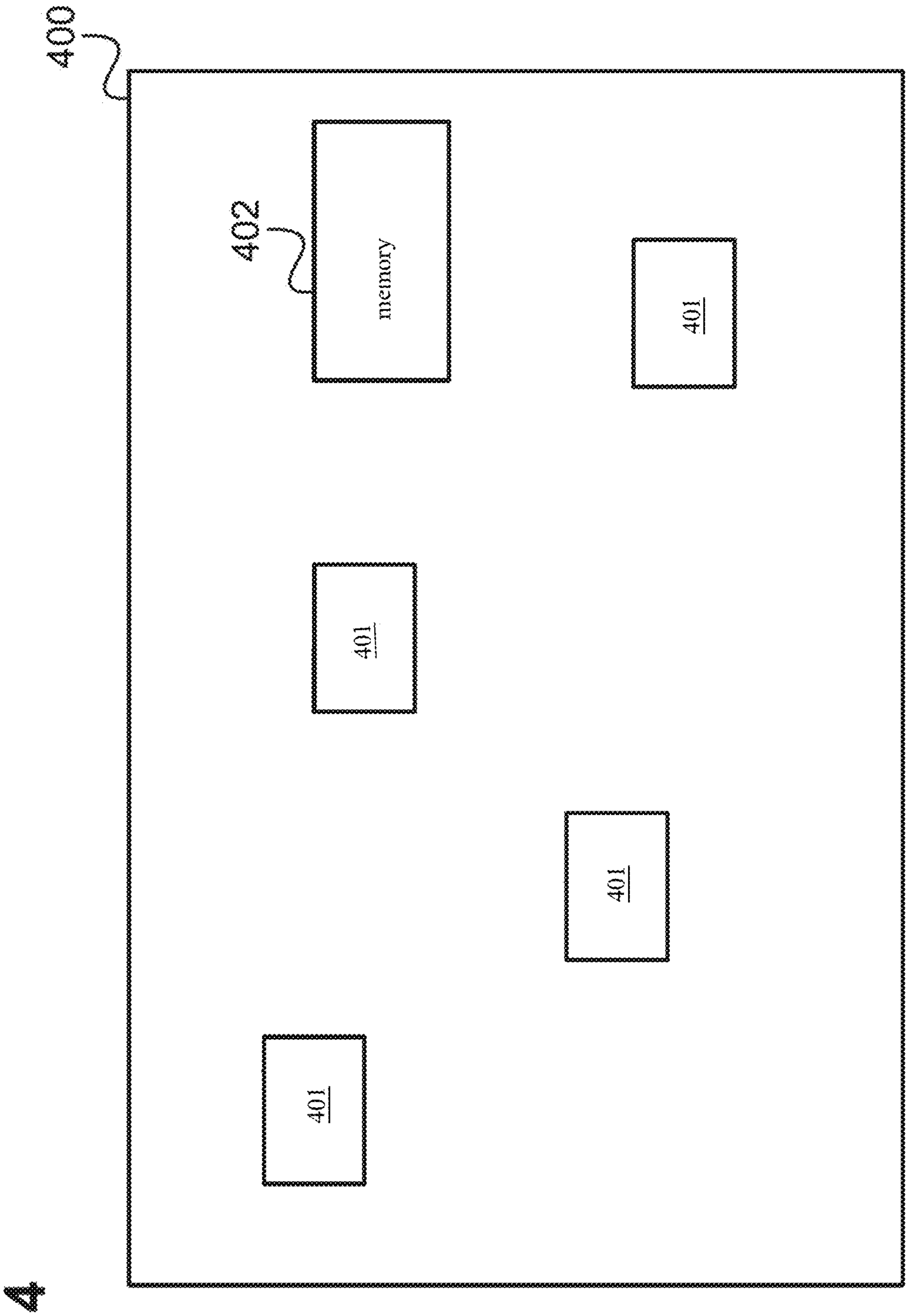
FIG. 4 shows a data processing device in accordance with one embodiment.

In summary, in accordance with various embodiments, a data processing device as illustrated in FIG. 4 is provided.

FIG. 4 shows a data processing device 400 in accordance with one embodiment.

The data processing device 400 has a plurality of data processing components 401 which are configured (for example by the firmware of the data processing device) to exchange respective synchronization information with one another in pairs at predefined (possibly individually per pair) synchronization points (i.e. each synchronization point is defined for a respective pair of data processing components, for example).

The data processing device 400 furthermore has a writable (by a user) configuration memory 402 (e.g. one or more configuration registers), which is configured to store, for each reset type of a plurality of reset types, whether the exchange of the respective synchronization information is required for all of the synchronization points, in order that the respective pair of data processing components may continue its processing beyond the synchronization points (or not).

The data processing components 401 are configured to continue or not continue their processing beyond synchronization points in accordance with the content of the configuration memory in the absence of an exchange of synchronization information.

According to various embodiments, the synchronization points that must be respected by the data processing components (processors, memory, control circuits, etc.) are configurable. This allows adaptation to requirements with regard to operational safety and/or data security of the respective application case.

In some examples, data processing components can be implemented as logic circuits, such as processors, on a single standalone chip or a single die, but in other examples data processing components are implemented on multiple dies stacked over one another or arranged within a single integrated circuit package in the form of a so-called 3-dimensional IC. In still other examples, data processing components may be formed on multiple packaged chips and/or discrete components on a printed circuit board (PCB). Data processing components can thus be coupled to one another by wires or buses, such as automotive cabling, metal traces on a PCB, and/or metallization interconnect layers of an integrated circuit die(s). A die may include a semiconductor substrate, such as a monocrystalline silicon substrate or a silicon on insulator substrate, but can also and/or alternatively include other semiconductor materials, such as gallium arsenide (GaAs), indium gallium arsenide (InGaAs), and germanium (Ge), among others. Further, the chip(s) can include transistors arranged in an application specific integrated circuit (ASIC), processor, and/or other hardware to specifically carry out the functions of the data processing components; and/or can include software or firmware instructions to carry out functions using a processor and memory. The memory can be read only memory (ROM), one-time programmable memory (e.g., fuses), or other non-volatile memory that stores the instructions in some examples. In some cases (e.g., ROM and fuses), the structural patterns present in the memory represent the bits of the executable instructions and differ from structural patterns of other memories that have other executable instructions. The same is true for other components, elements, blocks, circuits, and the like illustrated herein.

Various exemplary embodiments are specified below.

Exemplary embodiment 1 is a data processing device 400 as described with reference to FIG. 4. Thus, the plurality of data processing circuits are, in accordance with the information of the writable configuration memory, configured to either (a) halt processing beyond the predefined synchronization points when there is an absence of an exchange of synchronization information and then to continue their processing beyond the predefined synchronization points when the respective synchronization information is exchanged, or (b) continue past the predefined synchronization points whether or not synchronization information has been exchanged. Further, the configuration memory stores information on whether processing continues (a) past the synchronization point regardless of whether synchronization information is exchanged; or (b) stops at the synchronization point and waits for the synchronization information to be exchanged before proceeding. Thus, in the case that no synchronization information is exchanged, then whether or not processing continues beyond the synchronization points is determined by the content of the configuration memory. This additional control is advantageous compared to other approaches.

Exemplary embodiment 2 is the data processing device according to exemplary embodiment 1, wherein the configuration memory is configured to store, for each of the plurality of reset types, whether the exchange of the respective synchronization information is required for all of the synchronization points or only for a predefined portion of the synchronization points, in order that the respective pair of data processing components may continue its processing beyond the synchronization points.

Exemplary embodiment 3 is the data processing device according to exemplary embodiment 2 wherein the data processing components are configured to continue their processing after a reset after a synchronization point has been reached, even if the respective synchronization information has not been exchanged, if it is stored in the configuration memory that the exchange of the respective synchronization information is required only for a predefined portion of the synchronization points, in order that the respective pair of data processing components may continue its processing beyond the synchronization point, and the synchronization point reached does not belong to the predefined portion.

Exemplary embodiment 4 is the data processing device according to exemplary embodiment 2 or 3, having a firmware which defines which synchronization points belong to the predefined portion of the synchronization points.

Exemplary embodiment 5 is the data processing device according to any of exemplary embodiments 1 to 4, wherein the configuration memory is configured to store, for each of the plurality of reset types, whether the exchange of the respective synchronization information is required for all of the synchronization points or for none of the synchronization points, in order that the respective pair of data processing components may continue its processing beyond the synchronization points.

Exemplary embodiment 6 is the data processing device according to exemplary embodiment 5, wherein the data processing components are configured to continue their processing after a reset after a synchronization point has been reached, even if the respective synchronization information has not been exchanged, if it is stored in the configuration memory that the exchange of the respective synchronization information is not required for any of the synchronization points, in order that the respective pair of data processing components may continue its processing beyond the synchronization point.

Exemplary embodiment 7 is the data processing device according to any of exemplary embodiments 1 to 6, wherein the plurality of reset types comprise a cold-start reset, a warm-start reset and/or a software reset.

Exemplary embodiment 8 is the data processing device according to any of exemplary embodiments 1 to 7, wherein the content of the configuration memory is at least partially different for different reset types.

Exemplary embodiment 9 is the data processing device according to any of exemplary embodiments 1 to 8, wherein the configuration memory is furthermore configured to store, per reset type of the plurality of reset types, whether the sequence in which the data processing components continue with their processing after one of the synchronization points or after a further predefined synchronization point must follow a predefined sequence or may take place as determined by the respective processing durations, and the data processing components are configured to continue their processing according to the content of the configuration memory after the synchronization point or the further synchronization point.

Exemplary embodiment 10 is the data processing device according to exemplary embodiment 9, wherein the synchronization point or the further synchronization point is a synchronization point at the end of a pre-operating system phase of the data processing device.

Exemplary embodiment 11 is the data processing device according to exemplary embodiment 9 or 10, wherein the processing after the synchronization point or the further predefined synchronization point comprises loading an operating system component or an application.

Exemplary embodiment 12 is the data processing device according to any of exemplary embodiments 1 to 11, wherein at least some of the data processing components are processors.

Exemplary embodiment 13 is the data processing device according to any of exemplary embodiments 1 to 12, wherein the data processing components are at least partially equipped with different measures for establishing operational safety and/or data security.

Exemplary embodiment 14 is the data processing device according to any of exemplary embodiments 1 to 13, wherein the data processing components are configured to exchange the synchronization information via one or more synchronization memories which they write to and read from.

Exemplary embodiment 15 is the data processing device according to exemplary embodiment 14, wherein a first synchronization memory and a second synchronization memory are provided for each pair of the data processing components, wherein only the first data processing component of the pair can write to the first synchronization memory and only the second data processing component of the pair can write to the second synchronization memory.

Although the invention has been shown and described primarily with reference to specific embodiments, it should be understood by those familiar with the technical field that numerous modifications can be made thereto with regard to configuration and details, without departing from the essence and scope of the invention as defined by the claims hereinafter. The scope of the invention is therefore determined by the appended claims, and the intention is for all modifications to be encompassed which come under the literal meaning or the scope of equivalence of the claims.

LIST OF REFERENCE SIGNS

100 Data processing device
101 Data processing components
102 Domains
201, 202 Processors
203 Firmware
204 Software
205 Synchronizations
400 Data processing device
401 Data processing components
402 Configuration memory

What is claimed is:

1. A data processing device comprising:

a plurality of data processing circuits, which are configured to exchange respective synchronization information with one another in pairs at predefined synchronization points; and a writable configuration memory configured to store, for each reset type of a plurality of reset types, information on whether the exchange of the respective synchronization information is required for the predefined synchronization points, in order that a respective pair of data processing circuits continues its processing beyond the predefined synchronization points;

wherein the plurality of data processing circuits are, in accordance with the information of the writable configuration memory, configured to either (a) halt processing beyond the predefined synchronization points when there is an absence of an exchange of synchronization information and then to continue their processing beyond the predefined synchronization points when the respective synchronization information is exchanged, or (b) continue past the predefined synchronization points whether or not synchronization information has been exchanged.

2. A data processing device comprising:

a plurality of data processing circuits, which are configured to exchange respective synchronization information with one another in pairs at predefined synchronization points; and a writable configuration memory configured to store, for each reset type of a plurality of reset types, information on whether the exchange of the respective synchronization information is required for all of the predefined synchronization points, in order that a respective pair of data processing circuits continues its processing beyond the predefined synchronization points;

wherein the plurality of data processing circuits are configured to continue or not continue their processing beyond the predefined synchronization points in accordance with the information of the configuration memory in the absence of an exchange of synchronization information.

3. The data processing device as claimed in claim 2, wherein the writable configuration memory is configured to store, for each of the plurality of reset types, whether the exchange of the respective synchronization information is required for all of the predefined synchronization points or only for a predefined portion of the predefined synchronization points, in order that the respective pair of data processing circuits can continue its processing beyond the predefined synchronization points.

4. The data processing device as claimed in claim 3, wherein the plurality of data processing circuits are configured to continue their processing after a reset after a synchronization point has been reached, even when the respective synchronization information has not been exchanged, when it is stored in the writable configuration memory that the exchange of the respective synchronization information is required only for a predefined portion of the predefined synchronization points, in order that the respective pair of data processing circuits can continue its processing beyond the synchronization point, and the synchronization point reached does not belong to the predefined portion.

5. The data processing device as claimed in claim 3, wherein the data processing device further comprises firmware which defines which synchronization points belong to the predefined portion of the synchronization points.

6. The data processing device as claimed in claim 2, wherein the writable configuration memory is configured to store, for each of the plurality of reset types, whether the exchange of the respective synchronization information is required for all of the synchronization points or for none of the synchronization points, in order that the respective pair of data processing circuits can continue its processing beyond the synchronization points.

7. The data processing device as claimed in claim 6, wherein the data processing circuits are configured to continue their processing after a reset after a synchronization point has been reached, even when the respective synchronization information has not been exchanged, when the writable configuration memory stores that the exchange of the respective synchronization information is not required for any of the synchronization points, in order that the respective pair of data processing circuits can continue its processing beyond the synchronization point.

8. The data processing device as claimed in claim 2, wherein the plurality of reset types comprise a cold-start reset, a warm-start reset and/or a software reset.

9. The data processing device as claimed in claim 2, wherein the content of the writable configuration memory is at least partially different for different reset types.

10. The data processing device as claimed in claim 2, wherein the writable configuration memory is furthermore configured to store, per reset type of the plurality of reset types, whether a sequence in which the data processing circuits continue with their processing after one of the synchronization points or after a further predefined synchronization point must follow a predefined sequence or takes place as determined by the respective processing durations, and the data processing circuits are configured to continue their processing according to the content of the writable configuration memory after the one of the synchronization points or the further predefined synchronization point.

11. The data processing device as claimed in claim 10, wherein the one of the synchronization points or the further predefined synchronization point is a synchronization point at an end of a pre-operating system phase of the data processing device.

12. The data processing device as claimed in claim 10, wherein the processing after the one of the synchronization points or the further predefined synchronization point comprises loading an operating system component or an application.

13. The data processing device as claimed in claim 2, wherein at least some of the data processing circuits are processors.

14. The data processing device as claimed in claim 2, wherein the data processing circuits are equipped with different measures for establishing operational safety and/or data security.

15. The data processing device as claimed in claim 2, wherein the data processing circuits are configured to exchange the synchronization information via one or more synchronization memories which they write to and read from.

16. The data processing device as claimed in claim 15, wherein a first synchronization memory and a second synchronization memory are provided for each pair of the data processing circuits, wherein only a first data processing circuit of the pair is configured to write to the first synchronization memory and only a second data processing circuit of the pair is configured to write to the second synchronization memory.

17. A data processing device comprising:

a plurality of data processing circuits, which are configured to exchange respective synchronization information with one another in pairs at predefined synchronization points; and a writable configuration memory configured to store, for each reset type of a plurality of reset types, information on whether the exchange of the respective synchronization information is required for all of the predefined synchronization points, in order that a respective pair of data processing circuits continues its processing beyond the predefined synchronization points;

wherein the plurality of data processing circuits are configured to continue their processing beyond the predefined synchronization points when there is an absence of an exchange of synchronization information only when the information of the configuration memory allows this and otherwise to halt processing in the absence of an exchange of synchronization information.

* * * * *